United States Patent

[11] 3,628,939

| [72] | Inventor | Donald G. Trutner<br>Chatham, N.J. |
|---|---|---|
| [21] | Appl. No. | 855,089 |
| [22] | Filed | Sept. 4, 1969 |
| [45] | Patented | Dec. 21, 1971 |
| [73] | Assignee | Duro-Test Corporation<br>North Bergen, N.J. |

[54] GLASS TUBE-FORMING MACHINE
11 Claims, 11 Drawing Figs.

[52] U.S. Cl. .................................................. 65/276,
65/285, 214/1 BB, 214/1 P
[51] Int. Cl. .................................................. C03b 35/00
[50] Field of Search ...................................... 65/285,
276; 214/1 P, 1 B

[56] References Cited
UNITED STATES PATENTS
2,613,823  10/1952  Johns ........................... 214/1 BB FOREIGN PATENTS
714,361  8/1954  Great Britain ............... 214/1 BB

*Primary Examiner*—Arthur D. Kellogg
*Attorney*—Darby & Darby

ABSTRACT: An improved machine for forming one or more helical grooves in the walls of glass tubes in which the glass tubes are automatically transferred from one processing area of the machine to the adjacent processing area. Lifters for engaging the open ends of the glass tubes are attached to a movable carriage assembly which provides for the transfer of the tubes from one area of the machine to an adjacent area during its forward travel and provides for the grooving of the tubes during its reverse travel. A positioning mechanism insures that the lifters are properly aligned over the open ends of the tubes prior to engagement. An arrangement is also disclosed for transferring two tubes in tandem to increase the machine's processing speed.

INVENTOR
DONALD G. TRUTNER

BY Darby + Darby

ATTORNEYS

GLASS TUBE-FORMING MACHINE

It is known in the art that a fluorescent lamp having an envelope of noncircular cross section produces more useful light per unit of power input than a fluorescent lamp whose envelope is of circular cross section. It is further known that a noncircular cross section in the fluorescent lamp envelope can be obtained by providing grooves, and more preferably, helical grooves along the length of the outer wall of a glass tube forming the envelope. A machine for producing helical grooves in a glass tube is described in U.S. Pat. No. 3,399,984 to D. G. Trutner et al., which is assigned to the assignee of the subject application. The machine of that patent can be functionally divided into four sections which include a loading section, a preheating section, a groove forming section and an unloading section. Transfer of a glass tube from one section of the machine to the next is accomplished by axially sliding the tube along the length of the machine. While the machine is operative for its intended purpose, it has a disadvantage in that sliding of the tubes results in marks and scratches on the outer walls of the glass tubes, which adversely affect the lamp appearance and/or efficiency.

The invention described herein is an improvement of the helical grooving machine described in U.S. Pat. No. 3,399,984, and includes an apparatus for automatically transferring a glass tube from one processing area of the machine to an adjacent processing area without the necessity of sliding the tube. The transferring apparatus is formed by an engaging and lifting mechanism mounted on a transfer assembly. More specifically, the transfer assembly includes pairs of lifters that are separated by a distance approximately equivalent to the length of the glass tube to be transferred, and are mounted on parallel shafts. The shafts are actuated simultaneously to enable the lifters to engage the open ends of the tubes and lift them from the surface of the machine.

In operation of the machine of the subject invention, an actuator on the carriage assembly causes engagement of the lifters with the open ends of the glass tubes and lifting of the tubes from the surface of the machine. The carriage assembly moves longitudinally of the machine and transfers the tubes from one processing area from the machine to the adjacent processing area. The lifters are then disengaged from the open ends of the glass tubes, causing the tubes to be lowered onto the upper working surface of the machine.

The present invention also provides a novel type of rotatable lifter that performs the dual function of engaging the open ends of the glass tubes and lifting the tubes from the surface of the machine. In addition, another embodiment of the invention is disclosed wherein a first mechanism engages the open ends of the tubes, and a second mechanism lifts the engaged tubes from the working surface of the machine. The present invention also includes a positioning mechanism that insures that the carriage assembly is properly aligned over the open ends of the glass tubes in order that the lifters may properly engage the tubes.

Another embodiment of the present invention also provides a tube engagement and lifting mechanism that permits increased production of grooved glass tubes by doubling the number of tubes that can be processed in any one area of the machine.

It is therefore an object of the present invention to provide a novel apparatus for transferring a glass tube longitudinally of a helical grooving machine.

It is a further object to provide novel lifters that engage the open ends of the glass tubes and lift the tubes from the surface of the machine in one operation.

Another object is to provide apparatus for transferring glass tubes longitudinally of a grooving machine by first engaging the open ends of the glass tubes and then lifting the engagement mechanism and carrying the tubes to an adjacent processing area of the machine.

An additional object is to increase productivity of a glass tube grooving machine by simultaneous longitudinal transfer of a plurality of tubes positioned in tandem relationship in one processing area of the machine.

A further object is to provide apparatus for the simultaneous longitudinal transfer of a plurality of glass tubes aligned substantially in parallel across the width of a grooving machine from one processing area of the machine to the adjacent processing area.

Another object is to provide a transfer mechanism for a glass tube processing machine that automatically positions the lifters which are attached to the carriage assembly that shifts the tubes for engagement with the glass tubes.

Other objects and advantages of the present invention will become more apparent upon reference to the following specification and annexed drawings, in which:

The subject invention includes an engaging and lifting mechanism for a helical grooving machine for transferring glass tubes from one section of the machine to the next in order for continuous processing operations to be performed on the tubes in each section. To provide a fuller understanding of the present invention, a brief description of the helical grooving machine and the operations it performs on the glass tubes is provided.

Figure 1A:
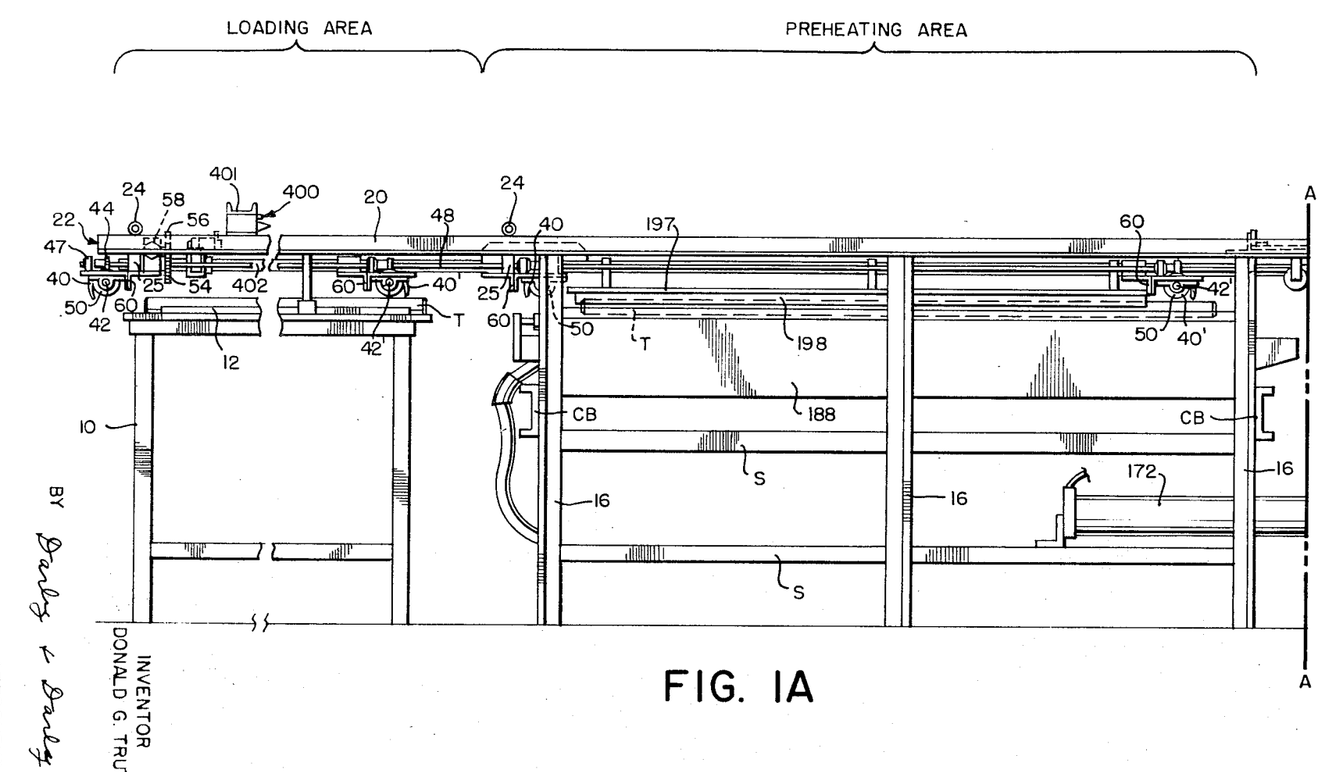
FIG. 1A is a side-elevational view of the first two sections of the helical grooving machine with parts broken out to permit illustration of the overall appearance.
Figure 1B:
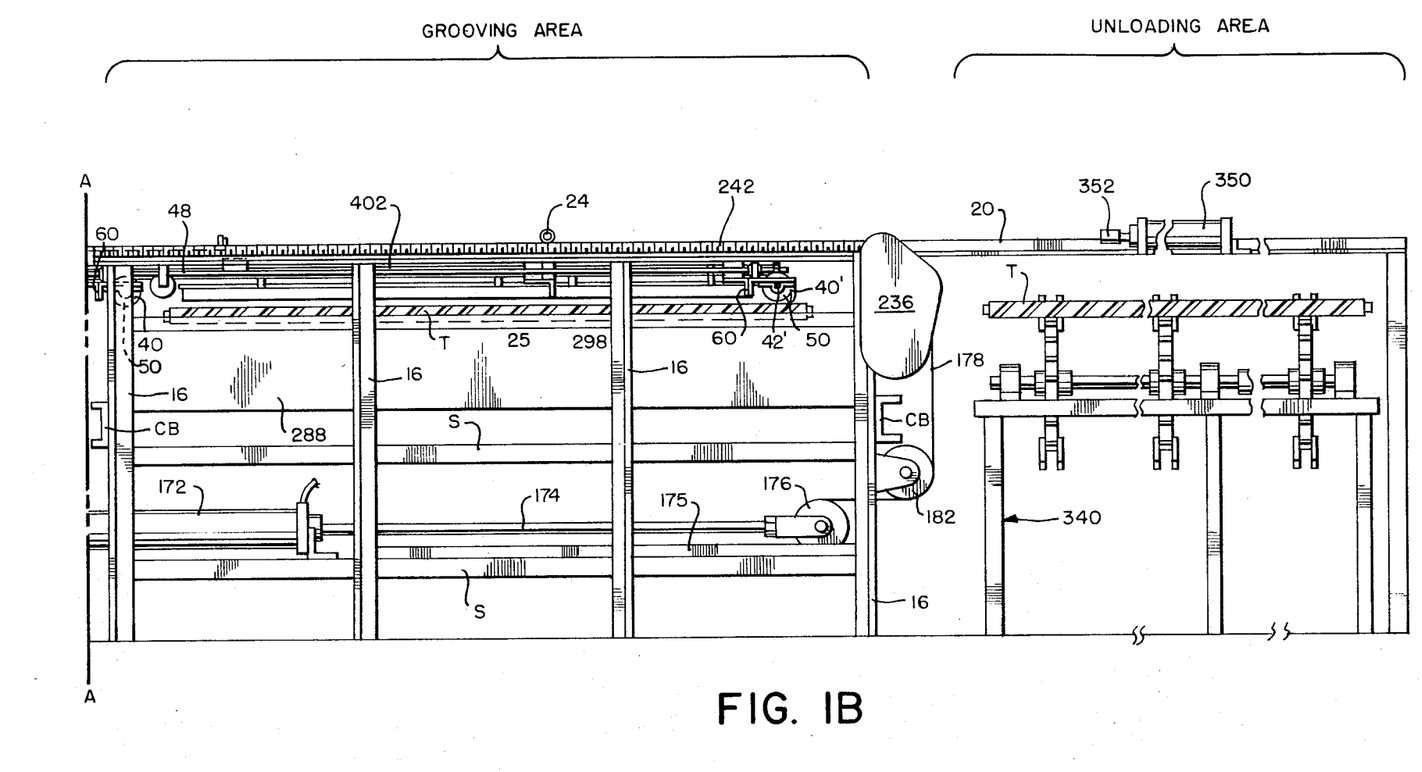
FIG. 1B is a side-elevational view of the latter two sections of the helical grooving machine with parts broken out to permit illustration of the overall appearance.

As shown in FIGS. 1A and 1B, the helical grooving machine may be functionally divided into four sections. As the glass tubes are moved from one section of the machine to the next, various operations are performed which result in a finished product when the tubes leave the machine. A left to right flow is described but, of course, the flow can also be in the opposite direction. The first section of the machine is the loading area. This is the input end of the machine into which thin wall glass tubes of circular cross section are placed. The next section of the machine is the preheating area where the tubes are heated to a temperature sufficient to prepare them for the grooving operation. The third section is the grooving area where the glass tubes are subjected to the grooving operation while they continue to be heated in a manner similar to that in the preheating area. In the embodiment of the machine to be described, a helical grooving operation is performed, but any suitable type of grooving can be accomplished. The final section of the machine is the unloading area where the grooved glass tubes are received and from where they are transferred, for example, to a packing area. This general arrangement is shown in the machine of the aforementioned patent. In general, it can be assumed that the tubes are manually placed on the loading area, and removed from the unloading area. Of course, a conveyor arrangement can be provided, if desired. It should be noted that the grooving machine operates simultaneously on a plurality of glass tubes which are aligned in parallel. The grooving machine of the subject invention operates on sets of four parallel aligned glass tubes simultaneously. Although the following description of the invention relates, in some instances, to the processing of a single glass tube, similar operations are taking place on all the other glass tubes of the set with which the single tube is aligned.

Figure 3:
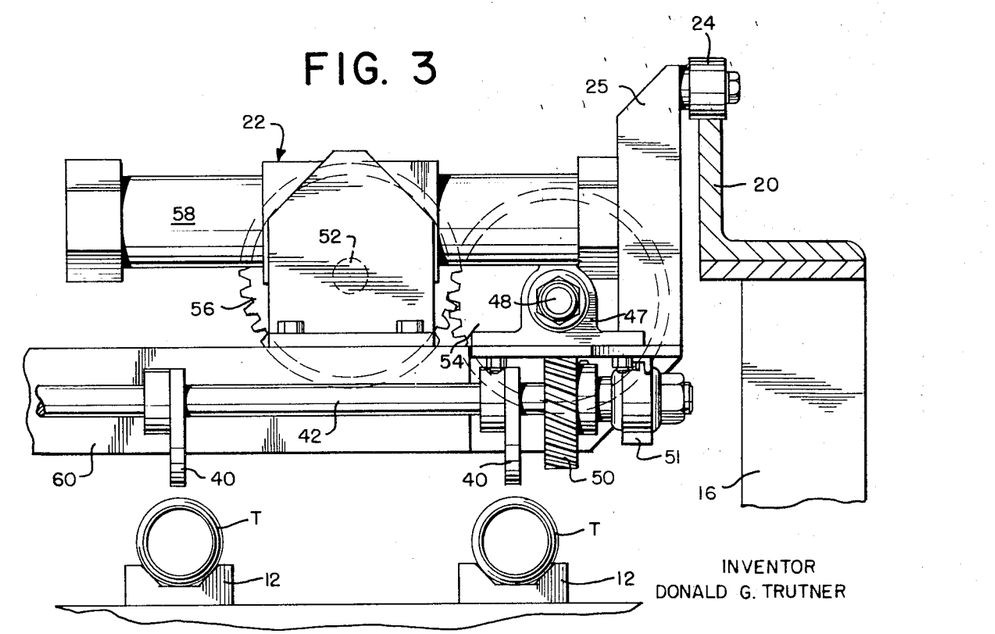
FIG. 3 is a rear view of the mechanism illustrated in FIG. 2.

Referring now to FIG. 1A, the loading area of the helical grooving machine will be described in detail. This section includes a table 10 having a plurality of U-shaped channels 12 secured to the upper horizontal surface of the table to insure the proper positioning of glass tubes T for subsequent movement into the preheating zone. As illustrated in FIG. 1A and 3, U-shaped channels 12 extend longitudinally of the loading area. The engaging and lifting mechanism and the positioning mechanisms which are both mounted on the upper frame of the helical grooving machine above table 10, will be described in detail below.

Referring now to FIGS. 1A and 1B, the main supporting structure of the preheating and grooving area includes a framework of structural members generally rectangular in elevation and plan. The framework comprises a plurality of vertical columns 16 which are cross connected by a series of cross braces CB and are longitudinally connected by a series of stringer members S. The members 16, CB and S can be interconnected in any suitable manner, for example by welding, to form a rigid framework.

An angle member 20 extends longitudinally of and is supported on the framework. A second angle member 18 corresponding and parallel to member 20, also is supported on and extends longitudinally of the framework. The upper edges of members 18 and 20 form guide rails on which a movable carriage assembly travels on rollers 24 and 26, respectively. As many sets of rollers 24 and 26 as needed are provided to support the carriage.

The movable carriage assembly extends approximately the length of three sections of the machine. The carriage is divided into three parts. The first part transfers tubes from the loading to the preheating area, the second transfers tubes from the preheating to the grooving area, and the third transfers tubes from the grooving to the unloading area. The third part of the carriage also carries the necessary equipment to perform the grooving operation. The three parts or sections of the carriage assembly move and operate in common to provide continuous processing of the lamps. In essence, sets of lamps are transferred sequentially from one area of the machine to the next.

A fluid pressure engine 172 (FIG. 1B), having a piston member 174, is mounted on the machine framework in the preheating and spiral grooving areas. A cable 178 has an end attached to the framework at a junction 116 of the framework and extends therefrom around a pulley wheel 176 supported at the end of piston 174, then around a pulley wheel 182 rotatably mounted on the framework, and finally around a pulley (not shown) located within a safety cover 236 mounted on the framework. The end of the cable 178 at the final pulley is connected to the movable carriage assembly at the grooving carriage portion. A channel 175 mounted in the lower portion of the framework, provides a guide for the reciprocating piston member 174, as it is retracted into and extended from engine 172. As the piston is retracted into engine 172, the complete carriage assembly is moved to the right. During this movement, there is a transfer of sets of bulbs from one area of the machine to the next.

In the preheating area of the machine, gas burner preheaters are supported on the framework and extend longitudinally thereof below the plane of carriage travel. Open top casings 188 enclose the preheaters, which are not shown. There is one preheater, or a group of preheaters, for each glass tube of a set to be processed. In the case illustrated, there are four tubes processed simultaneously, so there are four, or four sets, of preheaters. Supported at the top of each casing 188 are pairs of rotatable rollers (not shown) spaced to support each of the glass tubes T and provide an elongated channel through which heat can be transferred to the lower exposed surface of each of the glass tubes T. This is also described in detail in the aforementioned patent.

Hoods 198 extend along the top of the casings 188, and are supported on the carriage assembly by tubular members 197. By reason of their support from the carriage assembly, hoods 198 travel with the carriage assembly longitudinally of the tube T and casings 188. The preheaters operate as the carriage is moving from right to left during the time that the grooving operation is being performed. The tubes are preheated to a point where they still maintain rigidity in the longitudinal direction, so that they can be transferred without any sag of the glass.

Referring to FIG. 1B, heating assemblies 288 corresponding to those in the preheating section, are supported by the machine framework. Here again, there is one heater for each glass tube to be processed. Hoods 298 operate in association with heaters 288.

A carriage 22, shown in the loading area of FIG. 1A, of the movable carriage assembly, supports the engaging and lifting mechanism of the present invention. The portion of the movable carriage assembly for supporting the torches that form the grooves in the outer walls of the glass tubes T during the spiral or helical grooving operation in the grooving area, is not shown. The carriage carrying the grooving torches does not form part of the present invention. Details with regard to its operation may be found in U.S. Pat. No. 3,399,984 to D. G. Trutner, et al.

The unloading area of the machine is illustrated in FIG. 1B. A conveyor 340 transfers completed tubes received from the grooving area along a path perpendicular to the longitudinal path of travel of the tubes.

An air cylinder 350 with pusher head 352 mounted on the end of its piston rod is supported on the machine framework. A bracket (not shown) on the right end of the carriage assembly is positioned to engage pusher head 352. A lead screw 242 operates to return the carriage assembly to the left, to its starting position. This is described in detail below.

Figure 2:
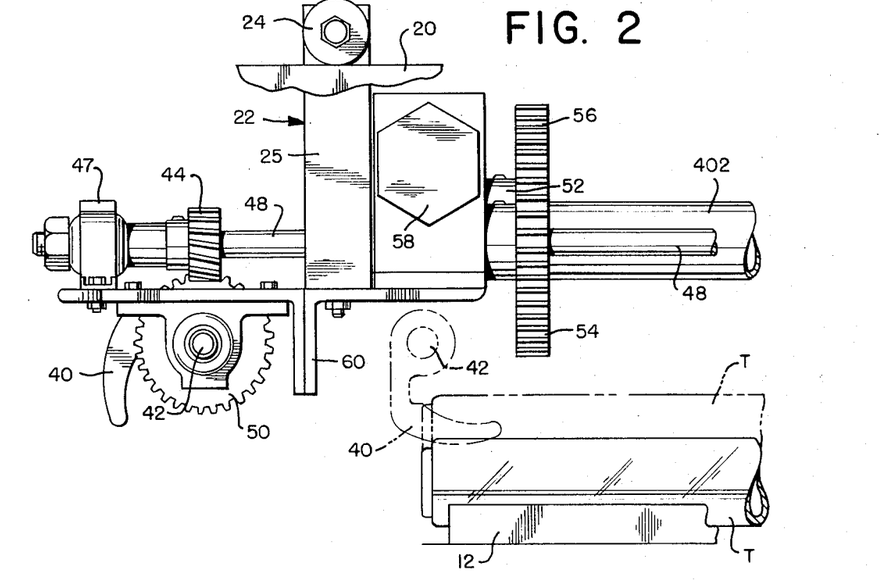
FIG. 2 is an enlarged side-elevational view of the preferred embodiment of the engaging and lifting mechanism of the present invention illustrating engagement of a lifter with a glass tube.
Figure 4:
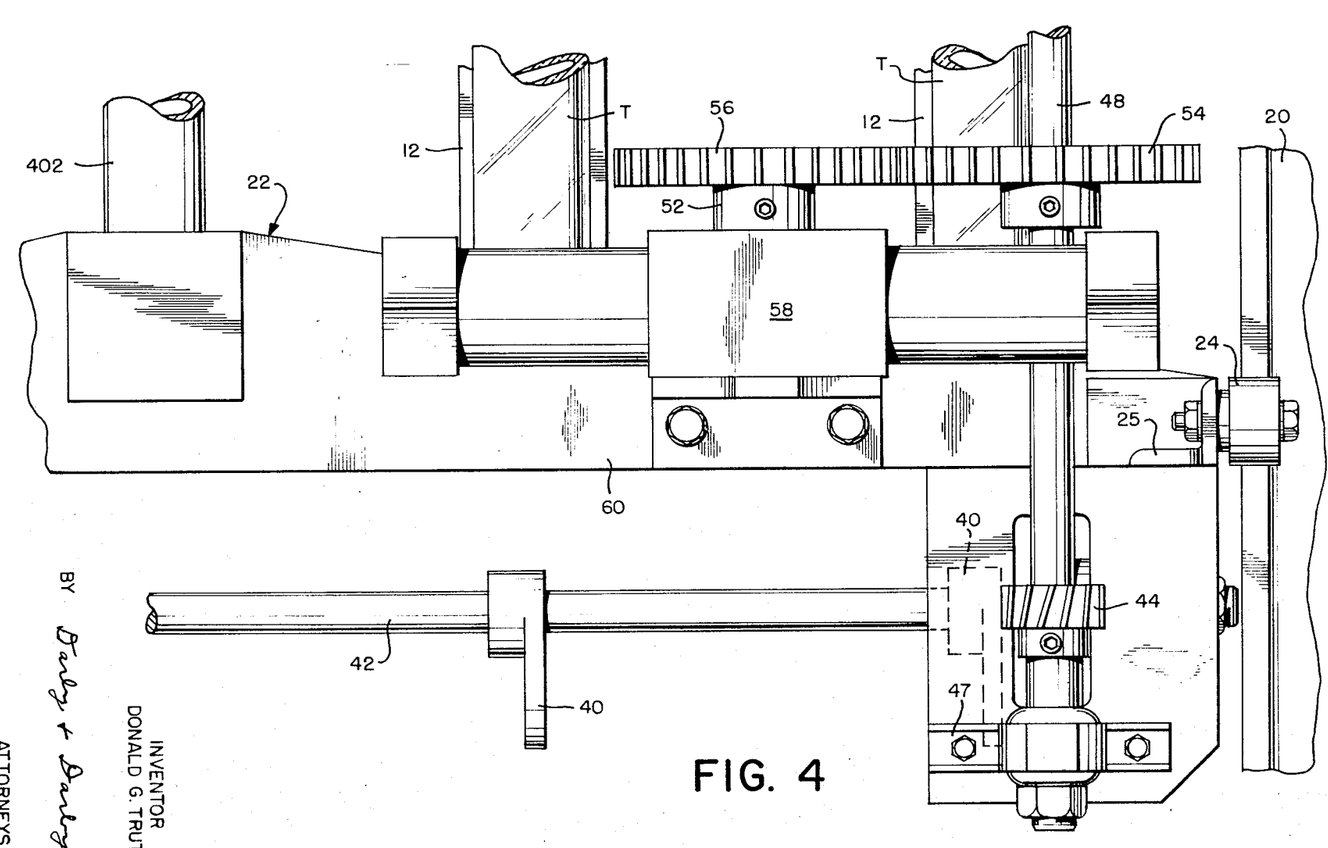
FIG. 4 is a plan view of the lifting mechanism illustrated in FIG. 2.

FIGS. 2, 3 and 4 illustrate the preferred embodiment of the engaging and lifting mechanism of the present invention in detail. The engaging and lifting mechanism illustrated in these figures is mounted on the portion of the movable carriage assembly which operates between the loading and the preheat areas. The other two portions of the carriage are substantially identical to the first, and the description to be given below applies to them, except where indicated. In general, a single source supplies power through a common drive shaft to operate all of the lifters of the three portions of the carriage.

As seen in FIG. 1A, there are a pair of lifters 40, 40' for each tube, which are spaced apart by a distance corresponding to the tube length. Each of the lifters 40 or 40' of a pair is equally spaced along its respective shaft 42 or 42' which lies transverse of the longitudinal axis of the machine. There are as many lifters 40 or 40' on a shaft 42 or 42' as there are tubes to be processed.

Each pair of lifters 40, 40' is aligned over a respective U-shaped channel 12 in the loading area of the machine so that the lifters can fit into the respective open ends of a glass tube T, engage and lift the tube, and transport the tube to the preheating area of the machine.

The action of the lifters 40' on the shaft 42' is the same as that of lifters 40 on shaft 42. As will be explained below, the two shafts 42, 42' are driven together. The following description is therefore made only with respect to lifters 40 and shaft 42. Rotation of shaft 42 causes the lifters 40 to rotate from a disengaged position (as shown in solid lines in FIG. 2) to an engaged position (as shown in dotted lines in FIG. 2). The terms disengaged and engaged refer to the position of the lifters with respect to the tubes T. When the lifters are fully engaged with the open ends of the tubes, the tubes are lifted above the surface of the machine and in position to be transferred to the next processing area of the machine. Rotation of shaft 42 through approximately 52° provides that the lifters 40 will engage the open ends of the tubes and lift them off the surface of the machine. The unique design of the lifters 40 enables them to perform the dual function of engaging the open ends of the tubes and lifting the tubes. For the glass tubes to be lifted off the surface of the machine, it is of course necessary that there be two lifters 40, 40'—one to engage each end of glass tube T.

As illustrated in FIGS. 2 and 3, roller 24 is rotatably mounted on an upright support 25 of the carriage 22, which forms a perpendicular connection with a roller support plate 60. Carriage roller 26 is rotatably mounted to a corresponding upright support (not shown) on the far side of the helical grooving machine (with reference to FIG. 1A) which is also connected to lower support plate 60. This arrangement provides for transfer of carriage 22 longitudinally of the helical grooving machine as the rollers 24, 26 move along the guide rails 18 and 20.

A motor 58 is mounted on carriage 22 near the left end, as seen in FIG. 1A. The shaft 52 of the motor has driver gear 56 which meshes with a driven gear 54 mounted to a shaft 48 upon which a gear 44 is mounted. The shaft 48 rotates within a journal box 47 at the left end of the carriage 22. Gear 44 meshes with a gear 50 which is rigidly attached to shaft 42 on which lifters 40 are mounted. The shaft 42 is to the left of the motor in FIG. 1A.

Upon actuation of motor 58, the gear 56 drives gear 54, which turns shaft 48, causing gear 44 to rotate. Gear 44 drives gear 50 which turns shaft 42 upon which the lifters are mounted.

As illustrated best in FIG. 2, the lifters 40, 40' are in the form of arcuate shaped fingers whose tips can enter the ends of the glass tubes. Upon rotation of a lifter 40 (in the counterclockwise direction as seen in FIG. 2), the lifter enters the open end of a glass tube T to initially engage the open end of the glass tube on the upper concave surface of the lifter. Further counterclockwise rotation of shaft 42 causes the lifter to move further into the tube and to lift the tubes from the guide channel 12. As should be noted, when the lifters 40 are in the nonengaging position (shaft 42 rotated to its clockwise extreme as seen in FIG. 2) the tips of the lifters clear the tube. This permits traversal of the carriage to the left after the tubes have been transferred.

As previously mentioned, there is a pair of lifters 40, 40' for each glass tube T to be processed. Referring to FIG. 1A, lifters 40' are mounted on the shaft 42' which is located on the right side of the loading area, to the right of motor 58. The shaft 48 extends the length of the carriage 22 and its right end, which is remote from the journal box 47, is operably connected to rotate shaft 42' by gears similar to those operably connecting shaft 42 to shaft 48. These additional gears are not shown. Therefore, actuation of motor 58 causes both shafts 42 and 42' to rotate simultaneously so that the lifters 40 and 40' each engage respective opposite ends of a glass tube T simultaneously.

The other two portions of the carriage, which are initially positioned over the preheating and grooving areas, respectively, each have a pair of shafts 42, 42' on which respective lifters 40 and 40' are mounted. Each of these shafts has a gear corresponding to the gear 50 of FIG. 2, on one end. The drive shaft 48 extends the length of the carriage assembly and has spaced thereon a number of bevel gears 44, each of which mates with a respective gear 50 on a shaft 42 or 42'. Thus, upon rotation of the motor 58, the lifters 40,40' on all six shafts 42,42' of the three carriage sections, are actuated simultaneously and in the same direction.

In operation of the machine, four glass tubes are placed on the U-shaped channels 12 in the loading area of the machine. At this point, the movable carriage assembly is in its furthest left hand position as illustrated in FIG. 1A. Motor 58 is actuated, causing lifters 40,40' to engage the open ends of the glass tubes and lift them from the U-shaped channels 12. Fluid under pressure is then supplied to the right-hand end of the fluid pressure engine 172 (FIG. 1B), thereby pulling piston 174 into the engine. Movement of piston 174 to the left causes cable 178 to pull the complete movable carriage assembly to the right a sufficient distance to transfer, by the carriage 22, the glass tubes placed in the loading area to the preheating area. The supply of fluid to engine 172 is then cut off and the carriage assembly comes to a stop. At this point, motor 58 is actuated to turn in the reverse (clockwise) direction needed for engagement of the tubes, and lifters 40,40' disengage the glass tubes T, as previously described, onto the working surface of the preheating area of the machine. In a similar manner, each of the other two sections of the carriage has transferred a set of four tubes from the preheating to the grooving area, and from the grooving to the unloading area, respectively.

The portion of the carriage used in the grooving area is at this time located at its furthest right hand position abutting pusher head 352. On the return trip of the complete movable carriage assembly to the left, the portion of the carriage carrying the grooving apparatus will perform the grooving operation on the glass tubes in the grooving area of the machine. At the same time, the tubes in the preheating section are heated. To return the complete carriage to its starting (left) position so that the grooving operation can be performed by the grooving apparatus as the carriage travels to the left, air is admitted into cylinder 350, causing its piston rod to extend. As should be apparent from FIG. 1A, there is some overtravel to the right for the carriage beyond the tubes T in the grooving area. This permits the flames for the various torches to be turned on. Through the engagement of pusher head 352 attached to the piston rod and an engaging bracket on the grooving carriage, the carriage is returned to its starting position to the right of the tubes in the grooving area, for the grooving operation. At this point lead screw 242 is actuated and engages a half-nut on the movable carriage assembly, causing it to move to the left at a predetermined speed with respect to the speed of rotation of the glass tubes T in the grooving area. Flames from the torches on the grooving carriage soften the glass tubes along the desired path, preferably helical, to form the grooved tube illustrated in the unloading area of FIG. 1B. The carriage speed to the left is usually lower than the speed of the carriage to the right during transfer of the tubes.

When the grooving operation is complete the complete movable carriage assembly is moving to the left. It is therefore necessary to stop the carriage assembly and accurately position it for engagement with the new set of tubes placed in the loading area. A positioning mechanism 400, located above the loading area of the machine, performs this function.

Figure 5:
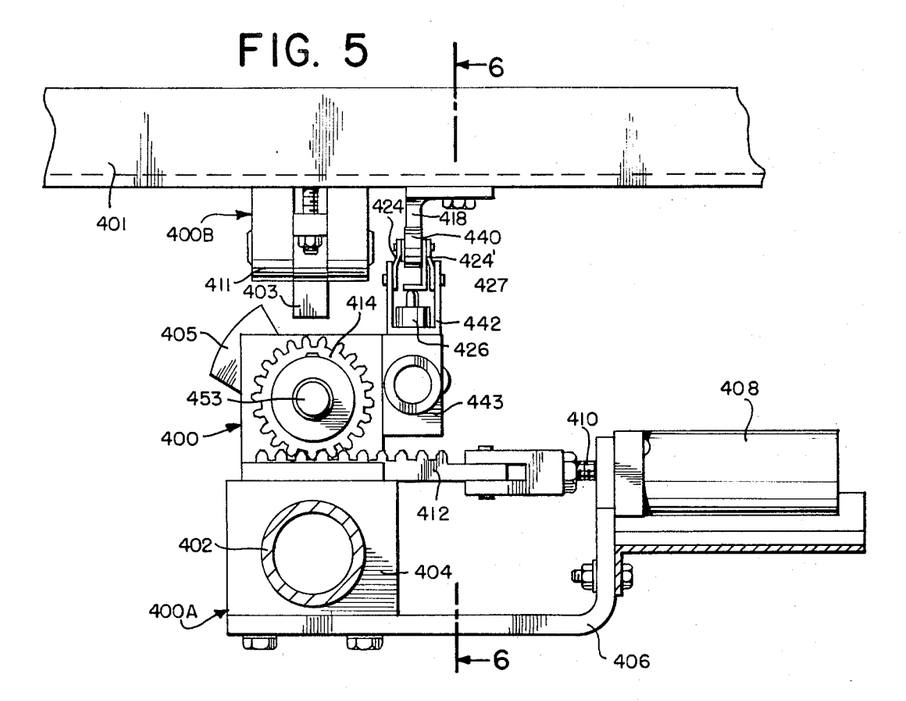
FIG. 5 is a rear view of the positioning mechanism mounted on the upper longitudinal frame of the helical grooving machine.
Figure 6:
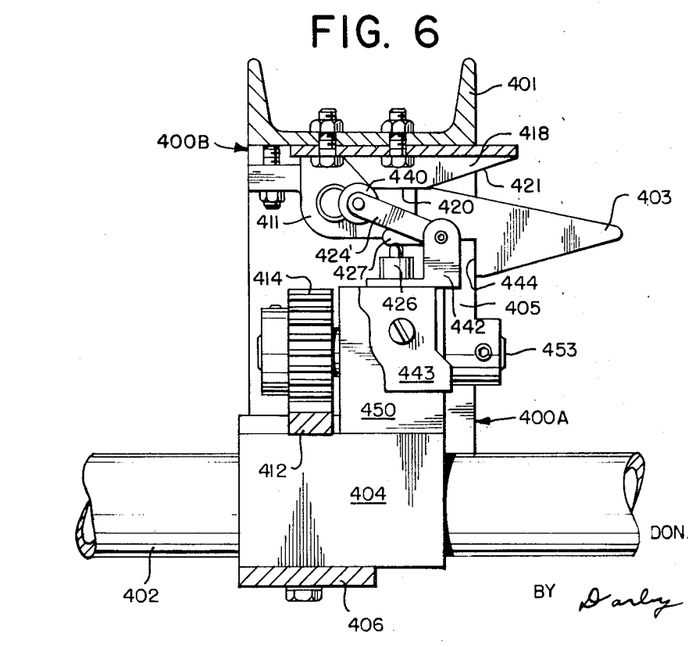
FIG. 6 is a cross-sectional view taken along the line 6—6 of the mechanism in FIG. 5.

As illustrated in FIGS. 5 and 6, positioning mechanism 400 has a movable section 400A and a stationary section 400B. The stationary section 400B is mounted on a beam 401 which extends across the width of the loading section of the machine above and transverse to the plane of carriage travel. The movable section 400A is attached to a shaft 402 which extends the length of the movable carriage assembly from carriage 22 to the grooving carriage. The position of the movable section 400A on shaft 402 can be adjusted to compensate for any desired length of tube to be processed. The movable and stationary sections of positioning mechanism 400 coact to stop the motion of the movable carriage assembly as it moves to the left (with reference to FIG. 1A) after the grooving operation is completed, and to position the movable carriage assembly so that the lifting elements of the three sections of the carriage are aligned to engage the open ends of the tubes.

Stationary section 400A includes a latch 403 pivotally mounted in a support member 411 which is attached to transverse beam 401. A cam 418 with camming surfaces 420 and 421 is also a part of the stationary section and is rigidly mounted on beam 401 adjacent latch 403. Latch 403 is generally in the shape of a solid right triangle with the edge forming the smallest angle pointing to right of the machine (with reference to FIG. 1A). The lower latch 403 corresponding to the hypotenuse of a right triangle, is cut out near the base of the triangular solid to form notch 444.

The movable section 400B includes an air cylinder 408 with piston 410, which is attached to an L-shaped frame 406, which is mounted on a support block 404. The support block is rigidly mounted on shaft 402 which extends the length of the movable carriage assembly. A cam 405 is rigidly mounted on a shaft 453 to which a gear 414 is attached. Shaft 453 is journaled in a support box 450 which is mounted on the top face of block 404. A gear 412 is rotatably mounted on block 404 and meshes with gear 414. The end of piston 410 is pivotally mounted on an outer lip of gear 412 so that when the piston extends inward into the cylinder, it causes rotation of gear 414. A roller 440 is rotatably mounted between a pair of levers 424 and 424' which are both pivotally mounted on frame 442 which is mounted on a microswitch support 443. Microswitch 426 is mounted on support 443 which is attached to support block 450. Microswitch actuator 427 is attached to frame 442.

In operation, the movable carriage assembly is moving to the left with movable positioning section 400B attached thereto. Cam 405 is in position to engage latch 403 (that is, cam 405 is at an angle of 90°). Cam 405 engages the lower surface of latch 403, causing the latch to pivot upwardly, thereby allowing the cam to pass thereunder freely until it reaches notch 44. Simultaneous with the engagement of cam 405 with the lower surface of latch 403 is the engagement of roller 440 with camming surface 421 on cam 418. Simultaneous with the engagement of cam 405 with notch 444 as the movable carriage assembly moves farther to the left is the engagement of roller 440 with camming surface 420. The engagement of roller 440 with camming surface 420 lowers microswitch actuator 427 so that it is in position to actuate microswitch 426 once the actuator and the microswitch are aligned. Simultaneous with the passage of cam 405 completely beneath notch 444 so that the latch rides over the cam as the movable carriage assembly moves still farther to the left is the engagement of actuator 427 and microswitch 426. When the microswitch is actuated it stops the motion of the movable carriage assembly. The carriage is stopped at a position where the three carriage sections have their respective lifters in a position to engage the new set of glass tubes.

When the glass tubes are engaged and lifted from the surface of the machine for transfer to the next station to the right, air cylinder 408 is actuated pulling piston 410 into the cylinder, thereby causing the gears 412 and 414 to rotate. Rotation of gear 414, which is connected to shaft 453, pushes cam 405 out of its engaging position in notch 444, as illustrated in FIG. 5. As cam 405 is brought out of engagement with latch 403, it causes microswitch 426 to disconnect. Movement of the carriage assembly to the right is then begun by supplying fluid under pressure to engine 172, as previously described. Since microswitch 426 is disconnected, it will not stop the motion of the carriage as the microswitch and actuator come into engagement again. When cam 405 clears latch 403, it is returned to its engaging position by cylinder 408 so that it will be in position to engage notch 444 on the next return trip of the movable carriage assembly to the left.

The timing circuits for operating the machine are not shown since they, in themselves, form no part of the present invention. These can be any suitable circuits, for example, fully electronic, electromechanical, etc. Such circuits are well known to those skilled in the art.

Figure 7:
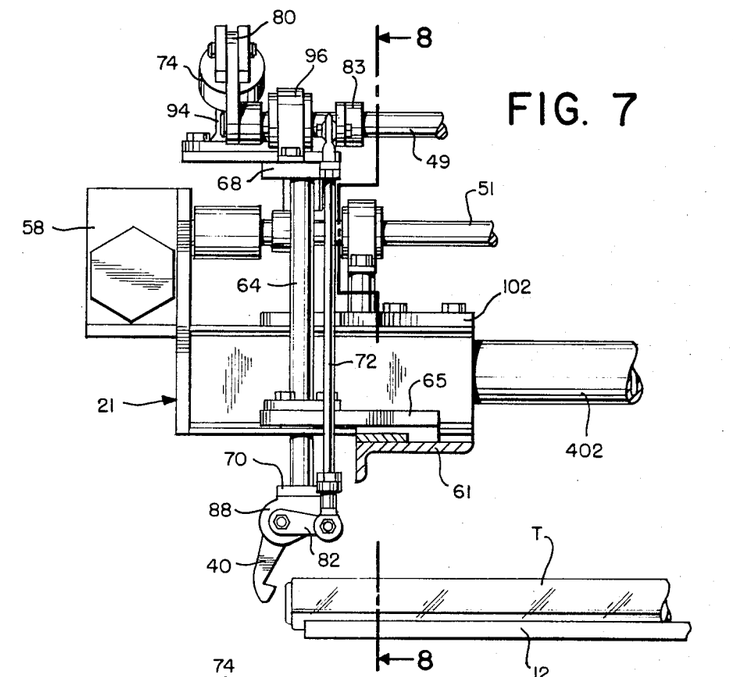
FIG. 7 is a side-elevational view of an alternate embodiment of the engaging and lifting mechanism of the present invention.
Figure 8:
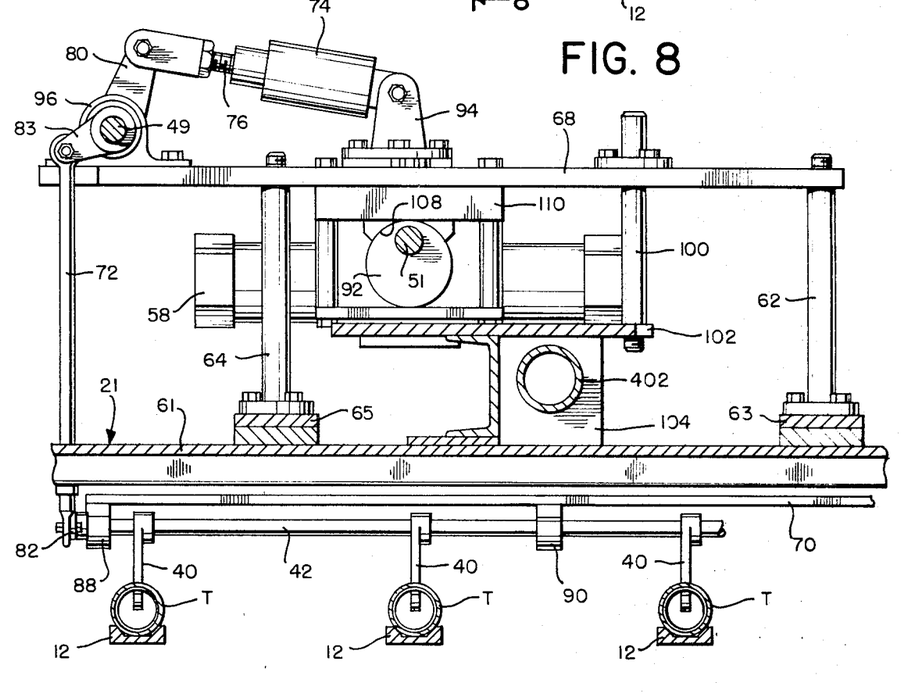
FIG. 8 is a cross-sectional view taken along the line 8—8 of the mechanism in FIG. 7.
Figure 9:
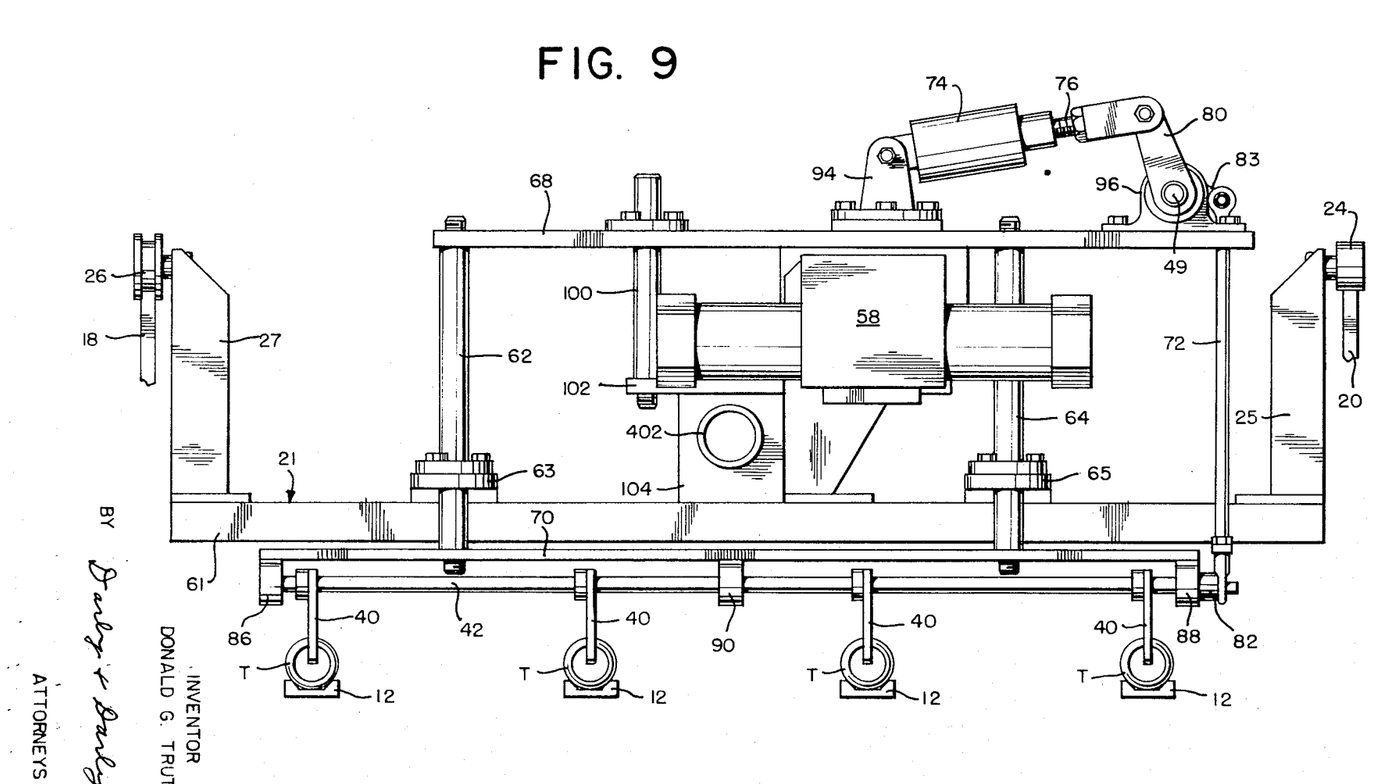
FIG. 9 is a rear view of the engaging and lifting mechanism illustrated in FIG. 7.

FIGS. 7, 8 and 9 illustrate another embodiment of the engaging and lifting mechanism of the present invention, which can be used for all three sections of the carriage. Here the first section of the carriage, used to transfer tubes between the loading area and the preheat area, will again be described. As before, the other two sections of the carriage operate in the same way. In FIGS. 7, 8 and 9, the carriage section 21 travels longitudinally of the machine on rails 18 and 20 by means of rollers 26 and 24, respectively. Roller 26 is here (FIG. 9) grooved to ride over rail 18 to provide stability for carriage 21 as it moves longitudinally of the machine. A lower support plate 61 is attached to rollers 26 and 24 by upright supports 27 and 25, respectively. As illustrated in FIG. 9, a frame 70 is rigidly attached to shafts 62 and 64 which are both connected to an upper support plate 68. Shafts 62 and 64 are disposed within bushings which are attached to cantilevered plates 63 and 65, respectively. The cantilevered plates are attached to lower support frame 61.

As in the preferred embodiment, lifters 40 are attached to rotate with shaft 42. The lifters are aligned over the tubes so that they may engage the respective open ends of the tubes. Shaft 42 is rotatably mounted in frame 70 in journal boxes 86, 88 and 90, which are connected to the frame 70. An air cylinder 74 has one end pivotally mounted on a support 94 which is attached to upper support plate 68. The movable piston 76 of air cylinder 74 is pivotally connected to a lever 80 which is attached to one end of a horizontal shaft 49. Shaft 49 is rotatably mounted in a journal box 96 located on upper support plate 68. A lever 83 has one end attached to rotate with shaft 49. The other end of lever 83 is pivotally connected to a shaft 72 which extends vertically from horizontal shaft 49 to the shaft 42 on which lifters 40 are mounted. The lower end of shaft 72 is pivotally connected to one end of a lever 82 whose other end is fixedly attached to shaft 42 to rotate the latter.

In operation, air cylinder 74 is actuated by transferring pressurized air into the cylinder and driving piston 76 out from the cylinder. The longitudinal force component exerted by piston 76 is transferred into rotational motion of shaft 49 by lever 80 and then back into generally vertical downward motion of shaft 72 by lever 83. Shaft 72 rotates levers 42 which causes lifters 40, which are rigidly attached to shaft 42, to move in a downward direction to engage the glass tubes T. When the piston 76 is retracted into the air cylinder 74, the lifter shaft 42 is rotated in the opposite direction to disengage the lifters 40 from the tubes. Thus, rotation of shaft 42 within frame 70 permits the lifters to engage and disengage the open ends of tubes T with which the lifters are aligned. Actuation of air cylinder 74 causes a rotational motion of approximately 20° of shaft 42.

Once the lifters 40 are in engagement with the open ends of the glass tubes, it is still necessary to lift the tubes from the surface of the machine in order to avoid scratches on the outer surfaces of the tubes during transfer. In the alternate embodiment of the present invention, this is accomplished by lifting frame 70, as described below.

As previously mentioned, frame 70 is rigidly attached to upper support plate 68 by shafts 62 and 64. Upper support 68 is free to move in a vertical direction relative to lower support plate 61. This vertical movement is provided by shaft 51 and an eccentric cam 92. Motor 58 is rigidly attached to movable carriage 21 and imparts rotational motion to shaft 51 when actuated. Eccentric cam 92 is attached to shaft 51. Directly above cam 92 is cam chamber 110 with camming surface 108. Middle support plate 102, which is mounted on support plate block 104, supports cam chamber 110. Support block 104 is mounted on lower support plate 61. Shaft 100, which is rigidly connected to shaft 102, is slidably connected to upper support plate 68.

In operation, motor 58 is actuated, thereby imparting rotational motion to shaft 51 so that cam 92, which is mounted thereto, comes into contact with camming surface 108 of cam chamber 110. This causes upper support plate 68, which is rigidly attached to cam chamber 110, to move vertically upward when the eccentric portion of cam 92 is in contact with camming surface 108. Since frame 70 is rigidly attached to upper support plate 68, when motor 58 is actuated, lifters 40, which had previously engaged the open ends of the glass tubes, will be lifted by frame 70 so that the tubes will be in position to be transferred to the adjacent processing area of the machine. Upper support plate 68 moves vertically upward relative to lower support frame 61 since shafts 62 and 64, which are connected to plate 68, are slidably disposed within bushings on cantilevered plates 63 and 65, respectively.

The remainder of the carriage would be similar to that described. Each of the other two sections would be constructed in a similar manner, as previously described. As seen in FIG. 7, the shaft 49 for imparting the rotational motion to the lifters and the shaft 51 for providing the vertical movement, both extend the complete length of the carriage assembly. These two shafts would be suitably connected to the lifter shafts 42 of the remainder of the carriage and also the frame 70 which is common to the entire carriage assembly. The arrangement for driving the complete carriage assembly to the right, to transfer tubes, and then back to the left to perform the grooving operation and be in a position to pick up the next set of tubes, is as previously described, with respect to the embodiment of FIGS. 1–6.

In the operation of the embodiment of FIGS. 7–9, it is necessary that the lifters 39,39' be raised as the carriage traverses to the left to clear the tubes. Thus, after the tubes are placed onto the working surfaces upon traversal of the carriage to the right, the shaft 51 is rotated in a direction to raise the lifters until the carriage has traversed fully to the left. At this time the shaft 51 is rotated to lower the lifters so that the tubes can be engaged.

Figure 10:
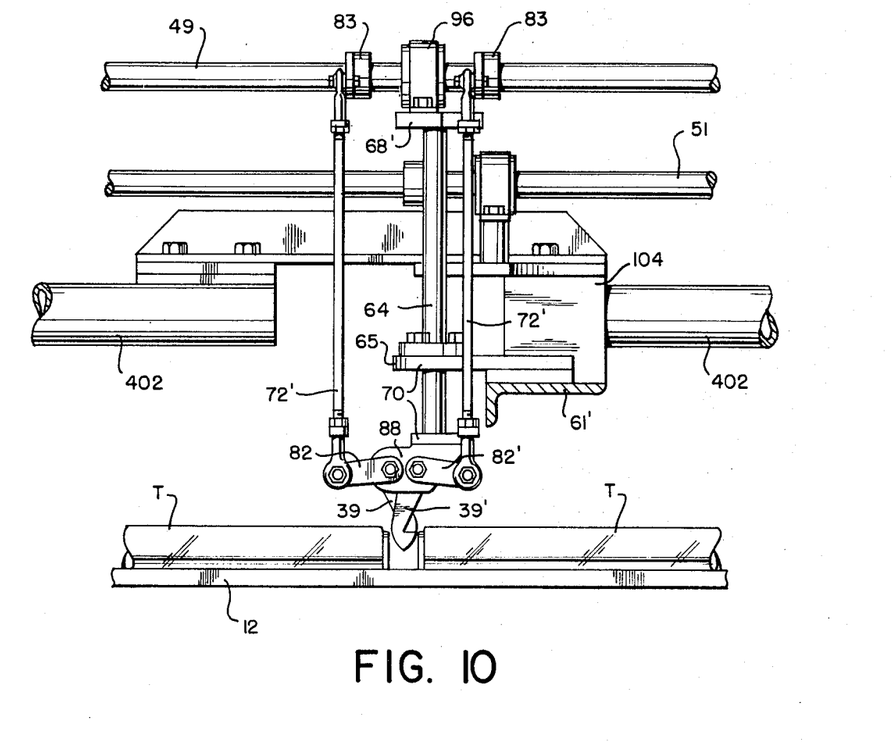
FIG. 10 is a side-elevational view of another embodiment of the present invention which provides for simultaneous transfer of two glass tubes in tandem from one processing area of the machine to the adjacent processing area.

FIG. 10 illustrates another embodiment of the lifting mechanism of the present invention that can be used in conjunction with the embodiment of lifting mechanism of FIGS. 7–9, described above to enable the grooving machine to double its productivity. In this embodiment, each of the processing areas of the grooving machine would be doubled in length. Therefore, in the loading area, for example, there would be two glass tubes in tandem relationship for each single tube previously processed. The lifting and engaging mechanisms at both ends of each one of the three carriage sections are the same as in the embodiment illustrated in FIG. 7. The engaging and lifting mechanism for each set of two tubes in tandem relationship in a given area must be capable of engaging two tubes simultaneously. Here again, the carriage section for transferring tubes between the loading and the preheat area is described. The other two carriage sections have similar mechanisms at the point between the two tandem tubes. As before, all of the lifters of all three carriage sections are rotated by the common shaft 51 and moved vertically by the common shaft 51. Again, the mechanism will be described with respect to a transfer from the loading to the preheating area.

FIG. 10 shows an arrangement of dual lifters 39 and 39' to enable the two tubes in tandem relationship in the loading area of the machine to be transferred to the preheater area.

In operation, the rotation of shaft 49 in the manner previously described with respect to FIGS. 7–9, causes two shafts 72' to move upwardly. Each arm 72' rotates a respective crank 82' which pivots a lifter 39 or 39' in a direction to engage the end of the adjacent tube. Lifters 39 and 39' are offset slightly with respect to one another on their respective shafts in order that the lifters do not interfere with one another when they are fully disengaged. After engagement, the shaft 51 is rotated causing the connected eccentric cam 92 (not shown) mounted thereon, to force upper support plate 68' vertically upward thereby lifting each of the two glass tubes from the surface of the machine.

The carriage assembly then proceeds to the right so that each carriage section moves the length of two tubes. The shafts 51 and 49 are rotated in the opposite direction so that the tubes are lowered down onto the station and the lifters are disengaged. In this embodiment, the shaft 51 is then rotated in the direction needed to raise the lifters vertically so that they will clear the tubes as the carriage assembly moves to the left to perform the grooving operation. After the carriage is at the leftmost position, the shaft 51 is rotated to lower the lifters so that they will be in a position to engage the tubes when the shaft 49 is rotated. Once the engagement takes place, the shaft 51 is again rotated to lift the tubes clear of the top surface of the machine.

As should be clear, the lifting arrangement of FIG. 10 can double the processing speed of the lamps. This, of course, is a decidedly advantageous result.

As should also be apparent, in each of the embodiments of the invention, the lifters do not engage the outside of a glass tube at points where they make contact. Instead, contact is made on the inside of the tube thereby preventing any unnecessary scratching of the tube, and also considerably simplifying the design of the lifters.

What is claimed is:

1. Apparatus for transporting glass tubes between a plurality of stations of a processing machine comprising means at each said station for supporting the glass tubes, carriage means, means for moving said carriage means from one station to another, said carriage means including means for engaging the ends of a tube at a said station and lifting the tube above the supporting means at said station and holding it above said supporting means as the carriage is moved to the next station, said engaging, lifting and holding means comprising a lifter at each end of the tube, each said lifter having a generally hooklike shape, means for rotating said pair of lifters together to bring the lead end of each said lifter into an end of the tube to engage the tube and for further rotating said pair of lifters together to bring each said lifter into engagement with the wall of the tube to lift the tube, the axis of rotation of said pair of lifters remaining vertically stationary during the engaging, lifting and holding operations.

2. Apparatus as in claim 1, wherein said rotating means comprises a respective shaft on which each said lifter is mounted, said shafts spaced apart by substantially the length of the tube to be transferred, driven means mounted on each said shaft, and means for simultaneously engaging and driving the driver means of each shaft to rotate the shaft and the lifter mounted thereon.

3. Apparatus as in claim 1, wherein said engaging means comprises a lifter with an extending finger, means for rotating said lifter to place said finger within the open end of the tube, means for moving said lifter substantially vertically to lift the tube from the supporting surface.

4. Apparatus as in claim 1, wherein each said engaging means comprises a lifter, each said lifter having an extending finger, means for rotating said pair of lifters together to place each said finger within an open end of the tube, and means for moving both said lifters together substantially vertical to lift the tube from the supporting surface.

5. Apparatus as in claim 3, wherein said means for moving the lifter vertically initially positions the lifter finger above the surface of the tube as the carriage traverses in a direction to engage another tube.

6. Apparatus as in claim 1, wherein said lifting means comprise an upper support plate mounted on said carriage, means for connecting said lifter to said support plate, an eccentric cam mounted adjacent said upper support plate, and means for actuating said cam into engagement with said support plate to move vertically said plate and said connected lifter.

7. Apparatus as in claim 1 further comprising means for stopping said carriage means on a return traverse to position said lifters to engage another tube on said supporting surface.

8. Apparatus as in claim 7, wherein said stopping and positioning means comprises a stationary and a movable section, said stationary section including a pivotally mounted latch, a first cam adjacent said latch, said movable section including a first shaft mounted on said carriage means, a second shaft mounted on said first shaft, a second cam rotatably mounted on said second shaft, means for rotating said second shaft to engage said second cam with said stationary section latch, roller means supported by said second shaft-supporting means for engaging said first cam and switch means actuated by said roller means for stopping said reciprocating carriage means.

9. Apparatus as in claim 1 for transporting a pair of tubes located in tandem on a said supporting surface, comprising means for engaging the ends of each tube of the tandem pair and lifting the pair above a said supporting surface and holding said pair of tubes as the carriage moves a distance substantially equal to the lengths of said two tubes.

10. Apparatus as in claim 9, wherein said engaging means comprises two pairs of lifters, a lifter of each pair being located to engage a respective outside end of a glass tube, the other two lifters of the two pairs located to engage the two adjacent ends of the two tubes, and means for operating all of the lifters substantially simultaneously to engage both said tubes.

11. Apparatus as in claim 10, wherein said operating means includes a common means arranged for moving the said other two lifters in opposite directions.

* * * * *